United States Patent
Knab et al.

(10) Patent No.: US 6,401,025 B1
(45) Date of Patent: Jun. 4, 2002

(54) CIRCUIT FOR OPERATING COMPUTING COMPONENTS, PARTICULARLY MICROPROCESSORS

(75) Inventors: Norbert Knab, Appenweier; Holger Pruessel, Buehlertal, both of (DE)

(73) Assignee: Robert Bosch, GmbH, Stuttgart (DE)

( * ) Notice: Subject to any disclaimer, the term of this patent is extended or adjusted under 35 U.S.C. 154(b) by 983 days.

(21) Appl. No.: 08/737,510

(22) PCT Filed: Feb. 16, 1996

(86) PCT No.: PCT/DE96/00242

§ 371 (c)(1),
(2), (4) Date: Nov. 13, 1996

(87) PCT Pub. No.: WO96/28780

PCT Pub. Date: Sep. 19, 1996

(30) Foreign Application Priority Data

Mar. 14, 1995 (DE) .......................... 195 08 793

(51) Int. Cl.⁷ ................................................ G06G 7/70
(52) U.S. Cl. ............................ 701/102; 701/1; 701/114
(58) Field of Search ........................ 701/31, 33, 102, 701/114, 1; 364/490, 569, 528.28, 528.41, 186, 136; 395/182.21, 184.01, 182.14, 185.08, 185.02, 185.03, 182.2, 182.12; 371/5.1, 12, 66, 62; 702/176, 183; 714/16, 47, 55, 23; 123/479; 700/293

(56) References Cited

U.S. PATENT DOCUMENTS

| | | | | |
|---|---|---|---|---|
| 4,231,091 A | * | 10/1980 | Motz | 701/102 |
| 4,287,565 A | * | 9/1981 | Haubner et al. | 364/528.28 |
| 4,363,092 A | * | 12/1982 | Abo et al. | 395/182.21 |
| 4,410,938 A | * | 10/1983 | Higashiyama | 701/102 |
| 4,597,052 A | * | 6/1986 | Matsuda | 701/31 |
| 4,635,258 A | * | 1/1987 | Salowe | 395/184.01 |
| 4,683,568 A | | 7/1987 | Urban | 714/23 |
| 5,519,643 A | * | 5/1996 | Kentrat et al. | 364/569 |

* cited by examiner

Primary Examiner—Jacques H. Louis-Jacques
(74) Attorney, Agent, or Firm—Venable; Norman N. Kunitz; Catherine M. Voorhees

(57) ABSTRACT

Suggested is a circuit for operating computing components (10), in particular microprocessors, which include a monitoring unit (24) that transmits a reset signal (23) to the computing component (10) as a result of interferences (35). A varied program sequence is provided in the computing component (10), depending on a compare signal (17, 18) provided by a comparator (13), which compares a signal (12) with at least one threshold value (14, 15) that mirrors a condition of a device (31), which cooperates with the computing component (10). An adjustment device is planned as a preferred embodiment of a device (31), wherein the condition corresponds to at least one position range that is preferably located at least near at least one stop position (34) for the adjustment drive (31).

9 Claims, 1 Drawing Sheet

CIRCUIT FOR OPERATING COMPUTING COMPONENTS, PARTICULARLY MICROPROCESSORS

BACKGROUND OF THE INVENTION

The invention relates to a circuit for operating computing components, in particular microprocessors, of the type including at least one reset device which, as a result of interferences, transmits a reset signal to the computing component, which can have a varied program sequence following the appearance of a reset signal, and wherein the sequence is determined in dependence on a compare signal provided by a comparator. From the EP-A 163 670, a device of the above type is known with two monitoring units for program-controlled arrangements, which detect short-term interferences or system failures and which subsequently transmit a reset signal to the microprocessor. Planned is a varied program is sequence following an occurring reset signal, which sequence is determined depending on a compare signal. The compare signal indicates that a digital number stored in a volatile memory coincides at least in part with a digital number stored in a fixed memory. If they coincide for the most part, it is assumed that the reset signal was triggered by a monitoring unit, which has emitted the reset signal, for example as a result of a high-frequency interference. If, however, it is determined that the two digital numbers do not have a common pattern, it is assumed that the reset signal was triggered by another monitoring unit, which emits a reset signal, for example during the startpup on the device. The program sequence that varies as a result of the comparison, if applicable permits a considerable shortening of the program restart time in that, for example, it is not necessary to have a complete initialization of the registers and that, for example, a new loading of the user programs or other operations need not be carried out.

Summary and Advantages of the Invention

The present invention comprises a circuit for operating computing components, in particular microprocessors, with the circuit including at least one reset device which, as a result of interferences, transmits a reset signal to the computing component which can have a varied program sequence following the appearance of a reset signal, with the sequence being determined in dependence on a compare signal provided by a comparator, and wherein the comparator compares a signal that reflects the condition of a device which is triggered by the computing component with at least one threshold value.

The circuit according to the invention for operating computing components, in particular microprocessors, has the advantage that the differences in the program sequence depend on the condition of a device which is controlled by the computing component. Taking into consideration the condition of the device makes it possible to distinguish between a reset signal which has appeared, for example, as a result of electromagnetic interferences and another reset signal. By taking into account the condition of the device, undesired operating situations in particular are avoided.

Advantageous improvements and embodiments of the inventive circuit for operating computing components, in particular microprocessors, result from dependent claims.

The circuit according to the invention is suited especially for a computing component that controls an adjustment drive activated by an electric motor. The signal corresponding to the condition of the device, which is compared by a comparator with at least one preset threshold value, is for an adjustment drive preferably of the position of the component that must be adjusted. For an adjustment drive that is operated by an electric motor, increased electromagnetic interferences through the increased motor current must be expected, especially when reaching mechanical limit stops, which may, if necessary, lead to a blocking of the electric motor. Having knowledge of the position of the component to be adjusted and once the reset signal appears, the decision can be made with the comparator on whether the program is to branch out to a complete initializing or to a considerably shortened restart point within the program.

An initializing provides, for example, for a calibration run of the adjustment drive, wherein an incremental position measuring system learns the stop positions of the adjustment drive. If it is recognized that the re set signal has appeared as a result of reaching one of the stop positions, then the calibration run preferably can be dispensed with.

The circuit according to the invention is suited especially for operating computing components, which control an adjustment drive arranged in a motor vehicle. Adjustment drives are used, for example, for different vehicle body components such as seat/mirror adjustment, window opener and sun roofs. Another use is in fuel dosing systems, especially for the adjustment of a butterfly valve controlled by an electric motor in the fuel dosing system of an internal combustion engine. For such adjustment drives, it is particularly advantageous if the calibration run, for example, is not performed for each occurrence of a reset signal.

One embodiment of the circuit according to the invention provides that the program sequence is additionally fixed by the number of occurring reset signals. This measure ensures that a predetermined number of reset signals occurring as a result of electromagnetic interferences will definitely lead to a program sequence, which includes, for example, the previously mentioned calibration run.

Other advantageous embodiments and improvements of the circuit according to the invention for operating computing components, in particular microprocessors, result from further dependent claims and from the following description.

BRIEF DESCRIPTION OF THE DRAWINGS

The FIGURE is a block diagram of an inventive circuit for operating computing components, in particular microprocessors.

DETAILED DESCRIPTION OF THE PREFERRED EMBODIMENT

Figure 1:
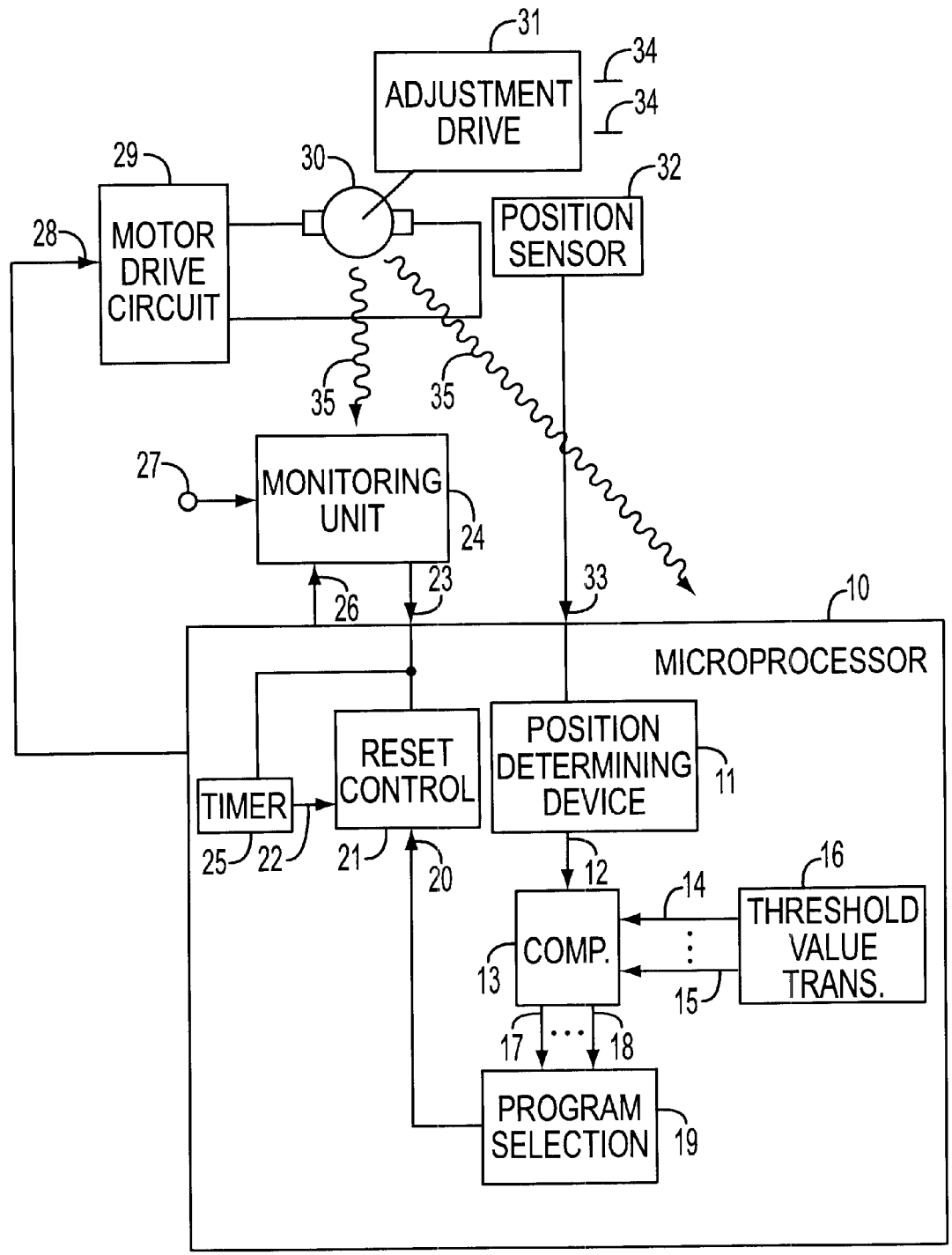

The figure shows a computing component 10, which is henceforth called a microprocessor. The microprocessor 10 includes a position determination device 11 that transmits a position signal 12 to a comparator 13, which compares the position signal 12 with at least one threshold value 14, 15 that is made available by a threshold value transmitter 16. The comparator 13 provides at least one compare signal 17, 18 in dependence on the comparison result, which signal fixes a certain program sequence in a program selection 19. The program selection 19 transmits a first selection signal 20 to a reset control 21, to which also a second selection signal 22 as well as a reset signal 23 are supplied.

The reset signal 23 makes available a monitoring unit 24, wherein the reset signal 23 is also fed to a timer device 25, which emits the second selection signal 22. The monitoring unit 24 provides the reset signal 23 in dependence on a first and second input signal 26, 27. The first input signal 26 is transmitted from the microprocessor 10 to the monitoring unit 24. The second input signal 27 is an external signal.

The microprocessor 10 transmits an output signal to a motor drive circuit 29, to which an electric motor 30 is connected that operates an adjustment drive 31. The adjustment drive position is detected by a position sensor 32, which transmits an incremental position signal 33 to the position determination device 11. The adjustment drive 31 can be moved between stop positions 34.

The circuit that includes the electric motor 30 and in particular the electric motor 30 itself are sources for the electromagnetic interferences 35, which act upon the microprocessor 10 and the monitoring unit 24.

The circuit according to the invention for operating computing components, in particular microprocessors 10, functions as follows:

In the exemplary embodiment shown, the microprocessor 10 controls the adjustment drive 31 that is operated by the electric motor 30. The electric motor 30 is controlled via the output signal 28 that is fed to the motor drive circuit 29. The motor drive circuit 29 determines the left-hand rotation or the right-hand rotation of the electric motor 30 in dependence on the output signal 28. The adjustment drive is, for example, arranged in a motor vehicle.

Adjustment drives in the body of a motor vehicle are, for example, a seat/mirror adjustment, a window opener or, for example, a sun roof. Other adjustment drives in motor vehicles exist for the fuel dosing.

A butterfly valve arranged in a fuel dosing for an internal combustion engine can, for example, be part of an adjustment drive.

The circuit according to the invention, however, is in no way limited to an adjustment drive or the use of the adjustment drive in a motor vehicle. The circuit according to the invention is generally designed for devices 31, which include the microprocessor 10. These devices 31 have in common that electromagnetic interferences 35 can occur, which influence the microprocessor 10 or, for example, the monitoring unit 24. The invention provides for a varied reaction to an appearance of the reset signal 23, depending on the condition of the device 31, which is transmitted by the monitoring unit 24 to the microprocessor 10. The reset signal 23 appears, for example, when the first input signal 26, which the microprocessor 10 transmits to the monitoring unit 24, is no longer present in the correct form. Another possibility for triggering the reset signal 23 is provided by the second input signal 27, which is made available, for example, by a current supply circuit that is not shown in detail, which signals a start-up of the operation with the second input signal 27 that leads to the triggering of the reset signal 23.

The devices 31 that include microprocessor 10 can exhibit conditions where the microprocessor 10 must only trigger specific condition changes. For a device 31 that is realized as an adjustment drive, the condition preferably corresponds to an adjustment drive 31 position, which reflects the position signal 12. For an adjustment drive as, for example, a device 31, a varied program sequence can subsequently be planned in dependence on the position signal 12 if a reset signal 23 appears.

The comparator 13 compares the position signal 12 with one or preferably several of the threshold values 14, 15 that are made available by the threshold value transmitter 16. For an adjustment drive 31, the at least one threshold value 14, 15 corresponds, for example, to a position corresponding to the stop position 34 or a position near the stop position 34.

With several threshold values 14, 15, one or several position ranges can be preset in a simple way. In dependence on the comparison results, the comparator 13 transmits at least the one compare signal 17, 18 to the program selection 19, which determines the different program sequence for an appearance of the reset signal 23. The program selection 19 transmits, for example, varied transfer addresses to the reset control 21. A reset signal 23 in general causes the microprocessor to activate a fixed, predetermined address, where the new command is fetched from. The command is fixed by the first selection signal 20, which presets for example the varied transfer addresses.

As a varied program sequence, it is possible on the one hand to provide for a complete initializing of the microprocessor 10 as well as a calibration run of the adjustment drive 31, for which the adjustment drive performs a complete movement cycle between stop positions 34 in order to determine the actual position on the basis of the incremental position signal 33 in the position determination device 11. On the other hand, it can be provided that at least the calibration run of the adjustment drive 31 within selected position ranges is omitted, for example, near the stop positions 34.

For a device 31 designed as adjustment drive, a rise in electromagnetic interferences 35 must be expected, in particular when reaching a stop position 34, because the electric motor 30 draws more current when reaching one of the stop positions 34, which may rise until it becomes an inhibiting current. As a result of the current increase, the circuit that includes the electric motor 30 as well as the electric motor 30 itself, if applicable, emit an increased electromagnetic interference radiation 35, which can lead to interference in the microprocessor 10 or the monitoring unit 24.

One advantageous improvement provides for the use of the counting device 25 that counts the number of occurring reset signals 23. After reaching a predetermined number of reset signals 23, the counting device 25 transmits the second selection signal 22 to the reset control 21. The second selection signal 22 has priority over the first selection signal 20 and, if necessary, determines another program sequence. This measure increases the safety of the whole circuit, which may be reduced in that the electromagnetic interferences 35 that occur with increased frequency for the specified conditions of arrangement 31 have led to the readying of selection signal 20 and have even affected the position determination device 11. During this operating condition, the second selection signal 22 determines that a complete initializing of the computing component 10 and in particular a calibration run of the adjustment drive 31 is triggered.

What is claimed is:

1. Circuit for operating computing components, in particular microprocessors, with said circuit including at least one reset device, which as a result of interferences transmits a reset signal to the computing component to provide a varied program sequence following the appearance of a reset signal, wherein said sequence is determined in dependence on a compare signal provided by a comparator, and wherein the comparator compares a signal that reflects the present condition of a device, which cooperates with and is controlled by the computing component, with at least one threshold value to provide the compare signal.

2. Circuit according to claim 1, wherein an adjustment drive operated by an electric motor is provided as the device.

3. Circuit according to claim 2, wherein the comparator compares a position signal that corresponds to the position of the adjustment drive with at least one threshold value.

4. Circuit according to claim 2, wherein the adjustment drive is arranged in the body of a motor vehicle.

5. Circuit according to claim 2, wherein the adjustment drive is arranged in the fuel dosing unit of an internal combustion engine in a motor vehicle.

6. Circuit according to claim 2, wherein within at least one preset position range of the adjustment drive, a calibration run is planned if a reset signal appears, for which the adjustment drive performs a complete movement cycle located between stop positions.

7. Circuit according to claim 6, wherein the calibration run is suppressed when the compare signal appears.

8. Circuit according to claim 2, wherein a position is predetermined with the at least one threshold value, which position is at least near at least one of the stop positions.

9. Circuit according to claim 1, wherein a counting device is provided that counts the number of reset signals and, after a predetermined number of counted reset signals provides a selection signal which changes the program sequence in the computing component.

* * * * *